United States Patent
Yu et al.

(10) Patent No.: US 8,987,939 B2
(45) Date of Patent: Mar. 24, 2015

(54) HYBRID POWER SYSTEM WITH VARIABLE SPEED GENSET

(75) Inventors: Dachuan Yu, Peoria, IL (US); Michael Parry Liechty, Chillicothe, IL (US); Mahesh Sitaram Illindala, Dunlap, IL (US); Matthew Thomas Muller, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1001 days.

(21) Appl. No.: 11/987,545

(22) Filed: Nov. 30, 2007

(65) Prior Publication Data

US 2009/0140576 A1    Jun. 4, 2009

(51) Int. Cl.
*H02J 3/46*    (2006.01)
*H02J 3/28*    (2006.01)
*H02J 3/38*    (2006.01)

(52) U.S. Cl.
CPC ... *H02J 3/46* (2013.01); *H02J 3/28* (2013.01); *H02J 3/383* (2013.01); *H02J 3/386* (2013.01); *H02J 3/382* (2013.01); *Y02E 70/30* (2013.01); *Y02E 10/563* (2013.01); *Y02E 10/566* (2013.01); *Y02E 10/763* (2013.01)
USPC ........... 307/76; 307/43; 307/47; 307/64; 307/65; 307/66; 307/67; 307/68; 307/69; 307/72; 307/74; 307/75

(58) Field of Classification Search
CPC .................. H02J 3/10; H02J 3/38; H02J 3/46
USPC .................. 307/17, 43, 47, 64–69, 72, 74–76
See application file for complete search history.

(56) References Cited

U.S. PATENT DOCUMENTS

| | | | | |
|---|---|---|---|---|
| 4,694,188 A | * | 9/1987 | Diegel et al. | 290/40 B |
| 4,719,550 A | * | 1/1988 | Powell et al. | 363/37 |
| 4,982,569 A | * | 1/1991 | Bronicki | 60/698 |
| 5,198,698 A | * | 3/1993 | Paul et al. | 307/64 |
| 5,225,712 A | | 7/1993 | Erdman | |
| 5,487,265 A | * | 1/1996 | Rajamani et al. | 60/773 |
| 5,539,258 A | * | 7/1996 | Sutton et al. | 290/40 R |
| 5,563,802 A | * | 10/1996 | Plahn et al. | 700/297 |
| 5,642,002 A | * | 6/1997 | Mekanik et al. | 307/64 |
| 5,703,410 A | * | 12/1997 | Maekawa | 290/40 C |
| 5,821,630 A | * | 10/1998 | Schutten | 290/30 R |

(Continued)

FOREIGN PATENT DOCUMENTS

DE    4232516    3/1993

*Primary Examiner* — Adi Amrany
(74) *Attorney, Agent, or Firm* — Finnegan, Henderson, Farabow, Garrett & Dunner, LLP

(57) ABSTRACT

A hybrid power system is disclosed. The hybrid power system may include a primary power source configured to provide a primary power, and an energy storage device coupled to the primary power source, the energy storage device configured to store excess primary power provided by the primary power source. The hybrid power system may further include a variable speed genset, the variable speed genset including a secondary power source configured to operate at a variable rotor speed to provide a secondary power responsive to power requirements of a load. The hybrid power system may also include a central controller communicatively coupled to the primary power source, the energy storage device, and the variable speed genset, the central controller configured to control the primary power source, the energy storage device, and the variable speed genset based on the power requirements of the load.

23 Claims, 6 Drawing Sheets

(56) References Cited

U.S. PATENT DOCUMENTS

| | | | |
|---|---|---|---|
| 5,852,353 A | 12/1998 | Kochanneck | |
| 5,929,538 A * | 7/1999 | O'Sullivan et al. | 307/66 |
| 6,051,892 A | 4/2000 | Toal, Sr. | |
| 6,118,186 A * | 9/2000 | Scott et al. | 290/40 B |
| 6,134,124 A | 10/2000 | Jungreis et al. | |
| 6,175,217 B1 * | 1/2001 | Da Ponte et al. | 322/19 |
| 6,184,593 B1 * | 2/2001 | Jungreis | 307/64 |
| 6,304,006 B1 * | 10/2001 | Jungreis | 307/64 |
| 6,605,880 B1 * | 8/2003 | Jaunich | 307/80 |
| 6,801,019 B2 * | 10/2004 | Haydock et al. | 322/17 |
| 6,864,594 B2 | 3/2005 | Seki | |
| 6,882,904 B1 | 4/2005 | Petrie et al. | |
| 6,900,998 B2 | 5/2005 | Erickson et al. | |
| 6,946,751 B2 | 9/2005 | Yoshida et al. | |
| 6,969,922 B2 * | 11/2005 | Welches et al. | 290/1 A |
| 7,045,702 B2 | 5/2006 | Kashyap | |
| 7,141,887 B2 | 11/2006 | Okubo et al. | |
| 7,245,039 B2 | 7/2007 | DuHamel | |
| 7,358,620 B2 * | 4/2008 | Melfi | 290/1 A |
| 7,392,114 B2 * | 6/2008 | Wobben | 700/286 |
| 7,456,518 B2 * | 11/2008 | Hjort et al. | 307/64 |
| 7,518,257 B2 * | 4/2009 | Guey et al. | 290/44 |
| 7,638,893 B2 * | 12/2009 | Wobben | 290/55 |
| 7,672,149 B2 * | 3/2010 | Falk | 363/98 |
| 8,022,562 B2 * | 9/2011 | Inagawa et al. | 290/40 A |
| 2004/0084965 A1 | 5/2004 | Welches et al. | |
| 2005/0200133 A1 * | 9/2005 | Wobben | 290/55 |
| 2005/0225090 A1 | 10/2005 | Wobben | |
| 2006/0249957 A1 | 11/2006 | Ito et al. | |
| 2007/0035135 A1 | 2/2007 | Yoshida | |
| 2007/0040386 A1 | 2/2007 | Shiota | |
| 2007/0048137 A1 | 3/2007 | Hartman | |
| 2007/0090651 A1 * | 4/2007 | Wobben | 290/44 |
| 2007/0138797 A1 | 6/2007 | Reidy et al. | |
| 2008/0179887 A1 * | 7/2008 | Kawazoe et al. | 290/44 |
| 2008/0203820 A1 * | 8/2008 | Kramer et al. | 307/64 |

* cited by examiner

HYBRID POWER SYSTEM WITH VARIABLE SPEED GENSET

TECHNICAL FIELD

This application relates to a hybrid power system, and more particularly, to a hybrid power system with a variable speed generator set.

BACKGROUND

For off-grid application sites, such as a telecommunication site or a remote village, reliable power supplies are needed. Hybrid systems containing combustion engine-driven generator setups (gensets) and battery banks are usually used to provide a continuous power supply. However, in these hybrid systems, refueling and maintenance costs become significant over time. In order to reduce such costs, renewable energy, such as photovoltaic power or wind power, may be used as the primary power sources, while diesel gensets may be used as secondary power sources. Excess energy generated by the primary or secondary power sources (i.e., energy not consumed by a load) may be used to charge a battery bank configured to store electric energy for backup use. Typically, it is preferred that a high percentage of energy is generated by the renewable power sources.

In a conventional hybrid genset system that uses synchronous-speed gensets, to maintain high efficiency of the gensets, limit machine wear, and avoid carbon build-up during partial loading, a common strategy for use of the genset system is called the full power minimum run time (FPMRT) strategy. This strategy calls for operation of the genset at full power for a prescribed minimum run time, after which it may be shut off if the loads can be fully supplied by the renewable power sources or batteries. Usually, the genset is oversized (e.g., 2.5 times oversized) in order to meet predicted peak loads, even though such a high load only lasts for a small percentage of its operation time. To efficiently store excess energy generated by such oversized gensets, oversized batteries may be required, which may significantly increase the cost of the power system. In addition, since FPMRT strategy has to charge a large amount of excess power to a battery, the corresponding hybrid power system may have a significant energy loss due to the inefficiency of charging the battery. Therefore, it is beneficial to develop a hybrid power system that operates the genset to meet the power requirements of a load so that frequent battery charging may be avoided. Finally, it is also advantageous that the rotor speed of the genset is adjustable, corresponding to desired low fuel consumption.

One wind power system with a variable speed wind turbine is described in U.S. Pat. No. 5,225,712 to Erdman ("the '712 patent"). The '712 patent describes a variable speed wind turbine that has the potential to reduce or eliminate substantial power fluctuations on the output line. The variable speed wind turbine includes a variable speed generator that converts wind energy to electric energy, a power converter, and a DC voltage link connected to an electrical energy storage device. According to the disclosure of the '712 patent, the power supply to the utility grid is controlled by the active switches at the power converter. In particular, the rotor speed of the generator is varied with the varying wind speed to improve energy recovery over a range of wind speed.

Although the wind power system described in the '712 patent may be effective for generating power from wind power sources, it may be problematic. For example, the system described in the '712 patent may be unreliable. Because the power system of the '712 patent operates exclusively from a wind power source, it may be incapable of operation when this source is not available. As a result, in the event of loss of wind power, loads that rely on continuous power supply may become inoperable.

Furthermore, the solution provided by the '712 patent may not be efficient and cost effective. For example, the generator rotates at a variable speed in accordance with the wind speed. As a result, the variable speed generator is driven by only by the available wind source and operates at a speed determined by the characteristic of the power source, for example, wind speed, instead of the characteristics of loads. Therefore, it may not efficiently provide a power supply based on the power requirements of a load. Consequently, the storage device, such as a battery, has to be oversized to ensure that all excess power can be saved. Otherwise, if the storage device is not scaled up, a large portion of generated electrical power may be wasted.

In addition, the system described in the '712 patent does not include voltage conversion devices and, therefore, may not provide the voltage level required by certain off-grid application sites. For example, the DC link voltage of the power system disclosed in the '712 patent may be a high voltage (e.g. 750 volts), which may not be compatible with low voltage applications, such as a telecommunication system that typically requires a 48 volt supply.

The disclosed hybrid power system is directed towards overcoming one or more of the problems set forth above.

SUMMARY

In one aspect, the present disclosure is directed to a hybrid power system. The hybrid power system may include a primary power source configured to provide a primary power, and an energy storage device coupled to the primary power source, the energy storage device configured to store excess primary power provided by the primary power source. The hybrid power system may further include a variable speed genset, the variable speed genset including a secondary power source configured to operate at a variable rotor speed to provide a secondary power responsive to power requirements of a load. The hybrid power system may also include a central controller communicatively coupled to the primary power source, the energy storage device, and the variable speed genset, the central controller configured to control the primary power source, the energy storage device, and the variable speed genset based on the power requirements of the load.

In another aspect, the present disclosure is directed toward a hybrid power system control method. The hybrid power system control method may include monitoring a power level associated with a primary power source. The hybrid power system may also include causing an energy storage device to store excess primary power when the power level associated with the primary power source exceeds a power requirement of a load, and release stored power when the power level associated with the primary power source is less than the power requirement of the load. The hybrid power system control method may further include monitoring a power level stored in the energy storage device, and operating a variable speed genset when the power level associated with the primary power source is less than the power requirements of the load and the power level stored in the energy storage device is less than a threshold level, the variable speed genset being configured to generate a secondary power.

DETAILED DESCRIPTION

Figure 1:
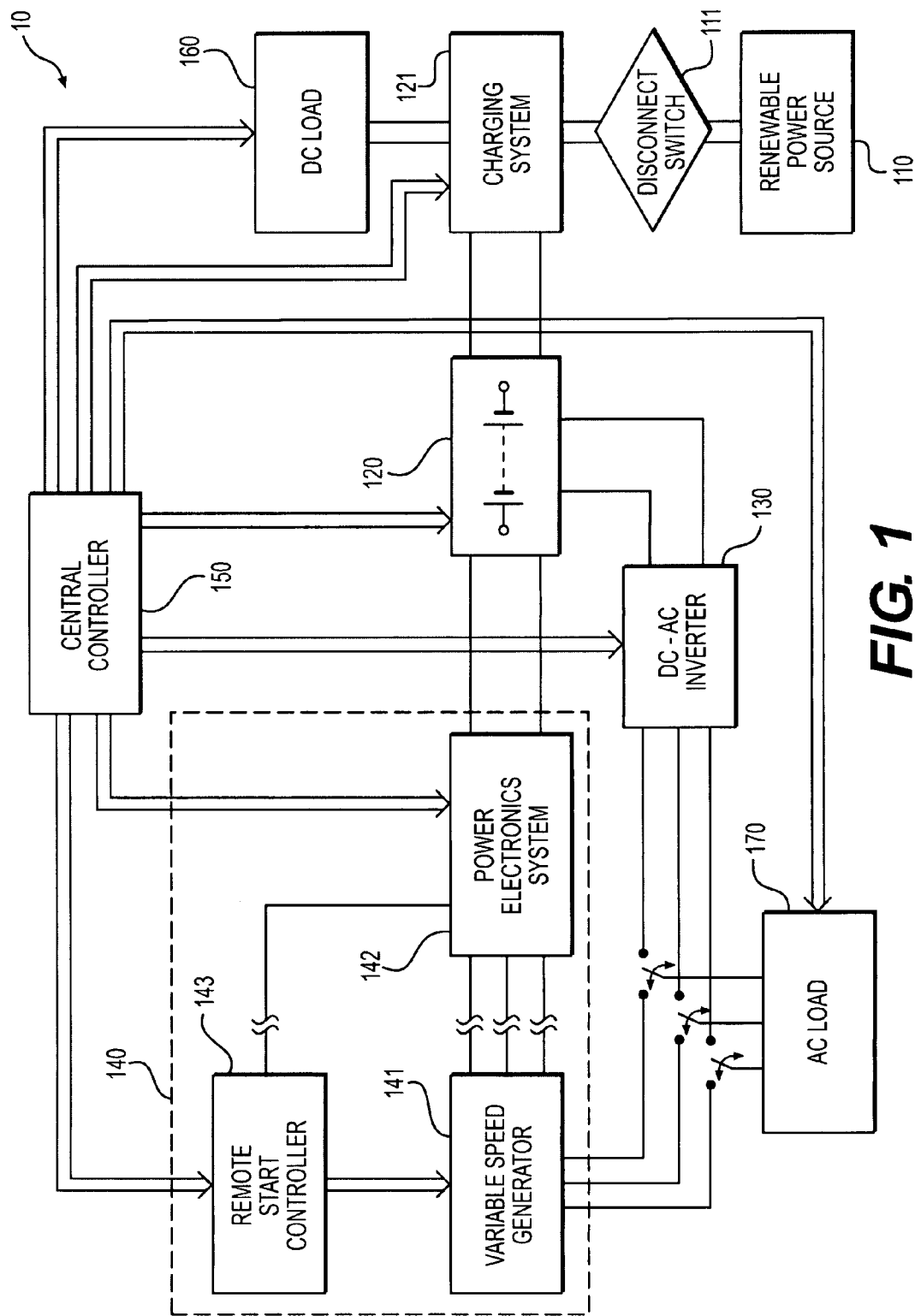
FIG. 1 illustrates a hybrid power system with a variable speed genset, in accordance with an exemplary embodiment of the present disclosure.

FIG. 1 illustrates a hybrid power system 10 with a variable speed genset 140, in accordance with an exemplary embodiment of the present disclosure. Hybrid power system 10 may include a renewable power source 110, an energy storage device such as a battery bank 120, a DC-to-AC inverter system 130, a variable genset 140, and a central controller 150. The hybrid power system 10, as the name suggests, combines at least two power sources to supply loads connected to the system. According to one disclosed embodiment, the hybrid power system 10 may combine renewable power sources with traditional fuel based power sources, such as diesel power.

The hybrid power system 10 may operate to alternately use several power sources based on their availability. For example, the hybrid power system 10 may use renewable power as the primary power source, and switch to diesel power only when the primary power source is not available. Alternatively, the hybrid power system 10 may operate to combine the use of several power sources at the same time to meet the load requirements. As shown in FIG. 1, the hybrid power system 10 may be utilized to power at least one DC load 160 and/or at least one AC load 170.

The renewable power source 110 may include any type of renewable power sources, such as solar power, wind power, terrestrial heat, hydroelectricity, biomass and biofuels, or their combinations. Compared to traditional fuel-based powers that are not renewable, these renewable power sources are sustainable and cost-effective in certain remote locations. The renewable power source 110 may be connected to an energy storage device, for example, a battery bank 120, via a disconnect switch 111 and a charging system 121. The disconnect switch 111 may be configured to isolate and protect the renewable power source 110 from damage due to power surges in the event of system fault.

The energy storage device such as the battery bank 120 may be configured to store excess energy and release the stored energy for usage when needed and/or as requested by one or more devices or systems of the hybrid power system 10. Consistent with one disclosed embodiment, the excess power provided by the renewable power sources 110 may be converted to electric power by a charging system and used to the charge the battery bank 120. Although the battery bank 120 is shown in the illustrated embodiment, it should be apparent to the skilled in the art that energy storage devices may also include other types of devices, such as a reformer in a fuel-cell system, a flywheel, or a super-capacitor.

When the renewable power sources 110 are not available or not sufficient to meet the power requirements of a load, the battery bank 120 may release the energy stored therein to supply power. The battery bank 120 may be electrically coupled to the DC load 160 and configured to provide a DC power to the DC load 160. The battery bank 120 may also be electrically coupled to the AC load 170 via the DC-to-AC inverter system 130. The DC-to-AC inverter system 130 may include a plurality of power electronic switching devices configured to convert a DC power provided by the battery bank 120 to an AC power to drive the AC load 170.

The excess energy stored in the battery bank 120 may be limited and may only be enough to supply the loads for a short time period. Therefore, a secondary power source may be incorporated as part of the hybrid power system 10 to provide a backup power supply while the renewable power source 110 is not available and energy in the battery bank 120 is below a threshold level. The threshold level may be stored in the central controller 150. It may be set by a user and selected as, for example, a level that prolongs battery life or provides a sufficient level in reserve to allow a secondary power source to start and/or reach a steady-state speed.

Consistent with the disclosed embodiment in FIG. 1, a variable speed genset 140 may be included. The variable speed genset 140 may be located near the renewable power source 110 and load. Alternatively or additionally, the variable speed genset 140 may be configured supply the power to a remote site via power transportation lines. The variable speed genset 140 may include at least one variable speed generator 141, a power electronic system 142, and a remote start controller 143. The variable speed genset 140 may be coupled to a primer mover (not shown), such as a diesel or gasoline combustion engine. The variable speed genset 140 may be configured to receive a mechanical power via a shaft coupled to a rotor of the variable speed genset 140, thereby generating an electric power output. The variable speed genset 140 may be configured to generate electric power in accordance with power requirements of the loads. Additionally, the variable speed genset 140 may also be configured to provide power to charge the battery bank 120.

The variable speed generator 141 may be coupled to a secondary power source (not shown), for example, a diesel engine, and operate to convert the power provided by the secondary power source to electric power. The variable speed generator 141 may be configured to operate at variable rotor speed and generate electric power with variable frequencies. The amount of electric power generated may be adjusted so that it meets the power requirements of the loads. Non-limiting examples of the variable speed generator 141 include wound rotor induction generator, self-excited induction generator, stator converter controlled induction generator, switched reluctance generator, permanent magnet synchronous generator, or any other suitable variable-speed power generator. The variable speed generator 141 may be coupled to the DC load 160 and/or the AC load 170 via the power electronic system 142. More detailed descriptions about the power electronic system 142 are included in later parts of the disclosure in accordance with FIG. 4 and FIG. 5. In the event that the frequency of the generated electric power matches with the one of the load, the variable speed genset 140 may also be coupled directly to the AC load 170.

The variable speed generator 141 may be operated by the remote start controller 143. The remote start controller 143 may be in communication with the central controller 150 and may be configured to operate based on control signals received from the central controller 150. For example, the remote start controller 143 may receive load information from the central controller 150 and operate to set the rotor speed of the variable speed generator 141 in response to the received load information.

The central controller 150 may include one or more components required to run an application, such as, for example, a memory, a secondary storage device, and a processor, such as a central processing unit. The central controller 150 may be coupled to the DC load 160 and the AC load 170 and may be configured to monitor power requirements of the loads. The central controller 150 may be coupled to the battery bank 120 and the charging system 121 to control the charging and discharging of the batteries. The central controller 150 may also be coupled to the power electronic system 142 and the DC-to-AC inverter system 130 and may control the switching of a plurality of power electronic devices to realize desired power conversion.

Figure 2:
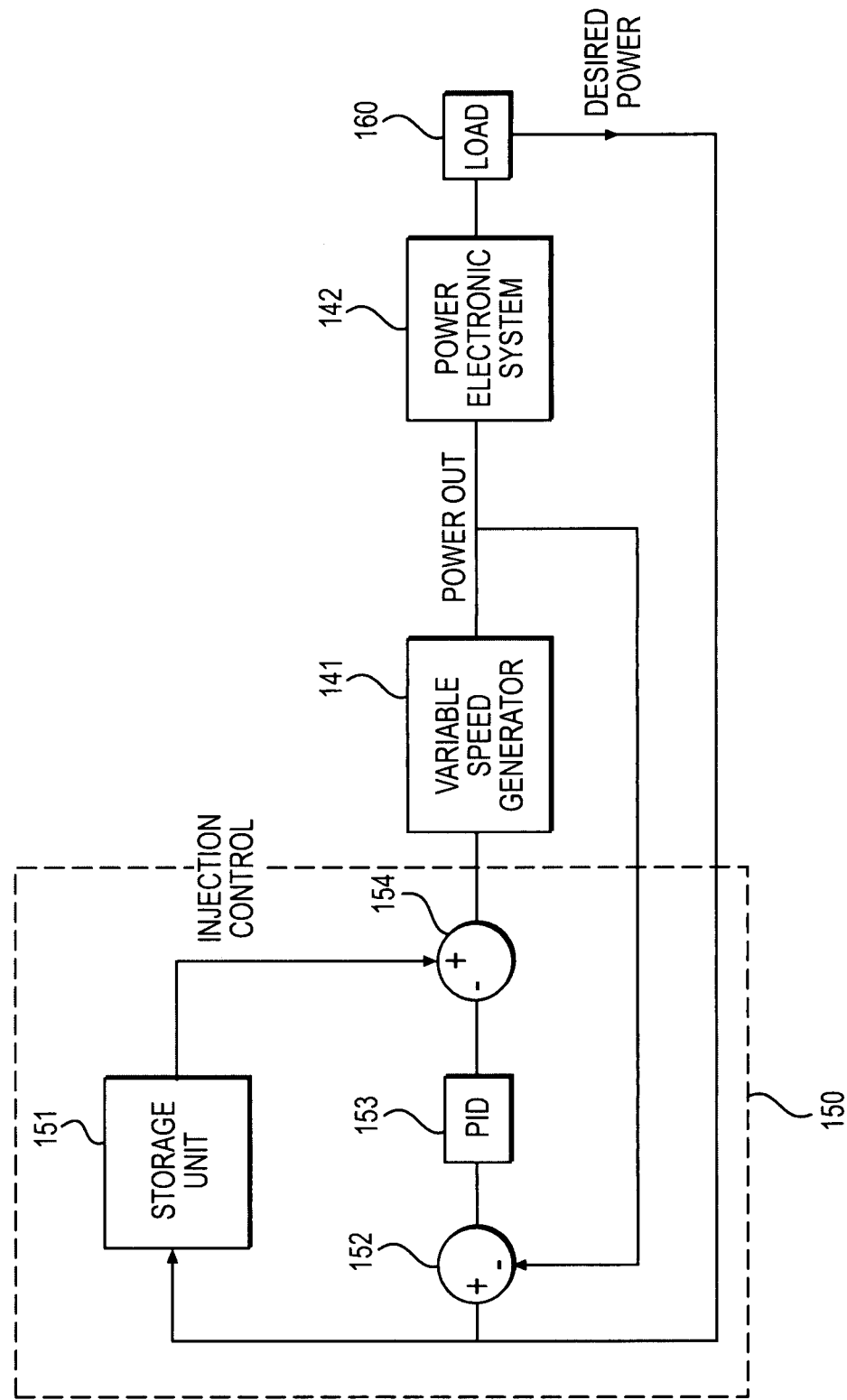
FIG. 2 provides a feedback control scheme of the variable speed genset disclosed in FIG. 1, in accordance with an exemplary embodiment of the present disclosure.

FIG. 2 provides a feedback control scheme of variable speed genset 140 disclosed in FIG. 1, in accordance with an exemplary embodiment of the present disclosure. The feedback control scheme may improve genset efficiency while eliminating the need for a speed governor. As shown in FIG. 2, a change in the desired power of the load 160 may be initially detected in the power electronic system 142. For example, battery bank 120 may be drawn when such a change take place. This leading knowledge of desired load may be used to operate the genset at a minimum fuel consumption for the given power requirement of the load 160.

Figure 3:
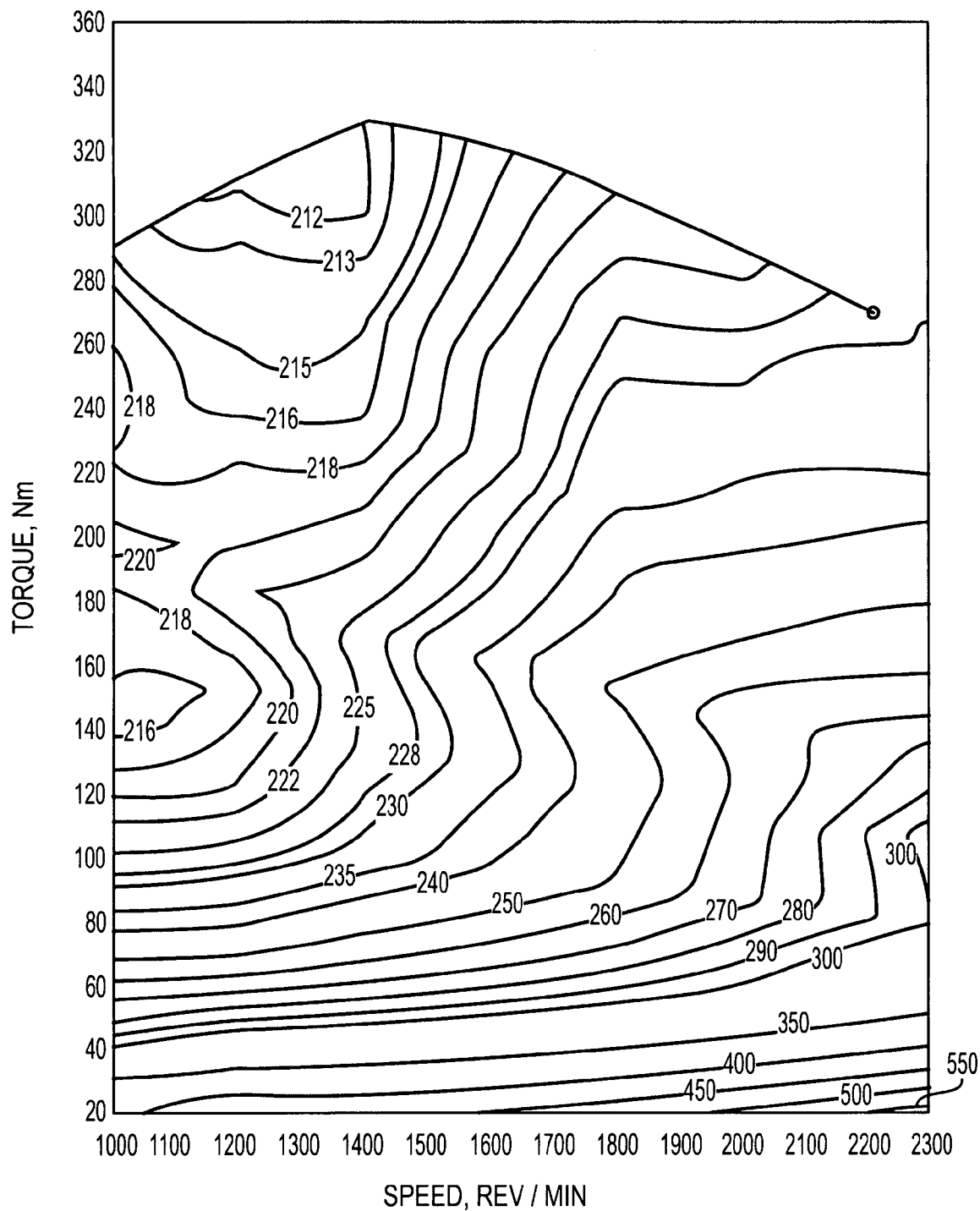
FIG. 3 provides a fuel map of the variable speed generator disclosed in FIG. 1, in accordance with an exemplary embodiment of the present disclosure.

Consistent with one disclosed embodiment, the central controller 150 may include a storage unit 151. The storage unit 151 may be configured to store a fuel map of the variable speed generator 141. FIG. 3 provides a fuel map of the variable speed generator 141 disclosed in FIG. 1, in accordance with an exemplary embodiment of the present disclosure. The fuel map may include a plurality of fuel consumption curves where each curve corresponds to a unique fuel consumption level of the variable speed genset 140. For example, the fuel consumption levels are labeled on each curve in FIG. 3. For an individual curve, each point on the curve corresponds to an output torque (in Nm) and a rotor speed (in rev/min) of the variable speed genset 140.

Based on power requirements of the loads, the central controller 150 may determine a target torque associated with the prime mover to meet the power requirements. The central controller 150 may be configured to identify and select a rotor speed for the prime mover of the variable speed genset 140 based on the target torque, to limit the fuel consumption of the generation. The central controller 150 may further determine a minimum steady-state fuel injection amount corresponding to the required rotor speed.

Meanwhile, a power output of the variable speed generator 141 may be monitored and compared with the power requirement of the load 160. A difference between the two may be taken at a feedback control node 152, and the difference may be fed into a proportional-integral-derivative (PID)/proportional-integral (PI)/proportional-derivative (PD) controller 153 as a feedback signal. PID/PI/PD controller 153 may provide an output to adjust the injection control signal. A difference between the output of the PID/PI/PD controller 153 and the injection control signal may be taken at a feed-forward control node 154, and the result may be sent to the variable speed generator 141 as a injection control signal. Such adjustment may provide a feed-forward control that optimizes the transient response to changing power requirement of the load 160 and minimizes steady-state error.

Consequently, operations of the variable speed genset 140 may be adjusted in response to the power requirement of the load 160, while limiting the fuel consumption of the prime mover. The combination of feed-forward and feedback control scheme in the disclosed embodiment as shown in FIG. 2 may efficiently match the genset power output with the load needs while allowing engine speed vary as needed.

The AC power generated by the variable speed generator 141 may not have a direct matching voltage and/or frequency to the loads. For example, the generated AC voltage may be over 500 volts, but a telecommunication application site requires a low voltage supply of 48v/24v. As another example, the generated AC voltage may have a variable frequency proportional to rotor speed, but an AC motor connected to hybrid power system 10 may require a voltage supply with a constant frequency of 60 Hz. Therefore, the variable speed genset 140 may include the power electronic system 142 that has a voltage scaler to adjust the voltage and a frequency changer to change the frequency of the generated power, in accordance with the load requirements.

Figure 4:
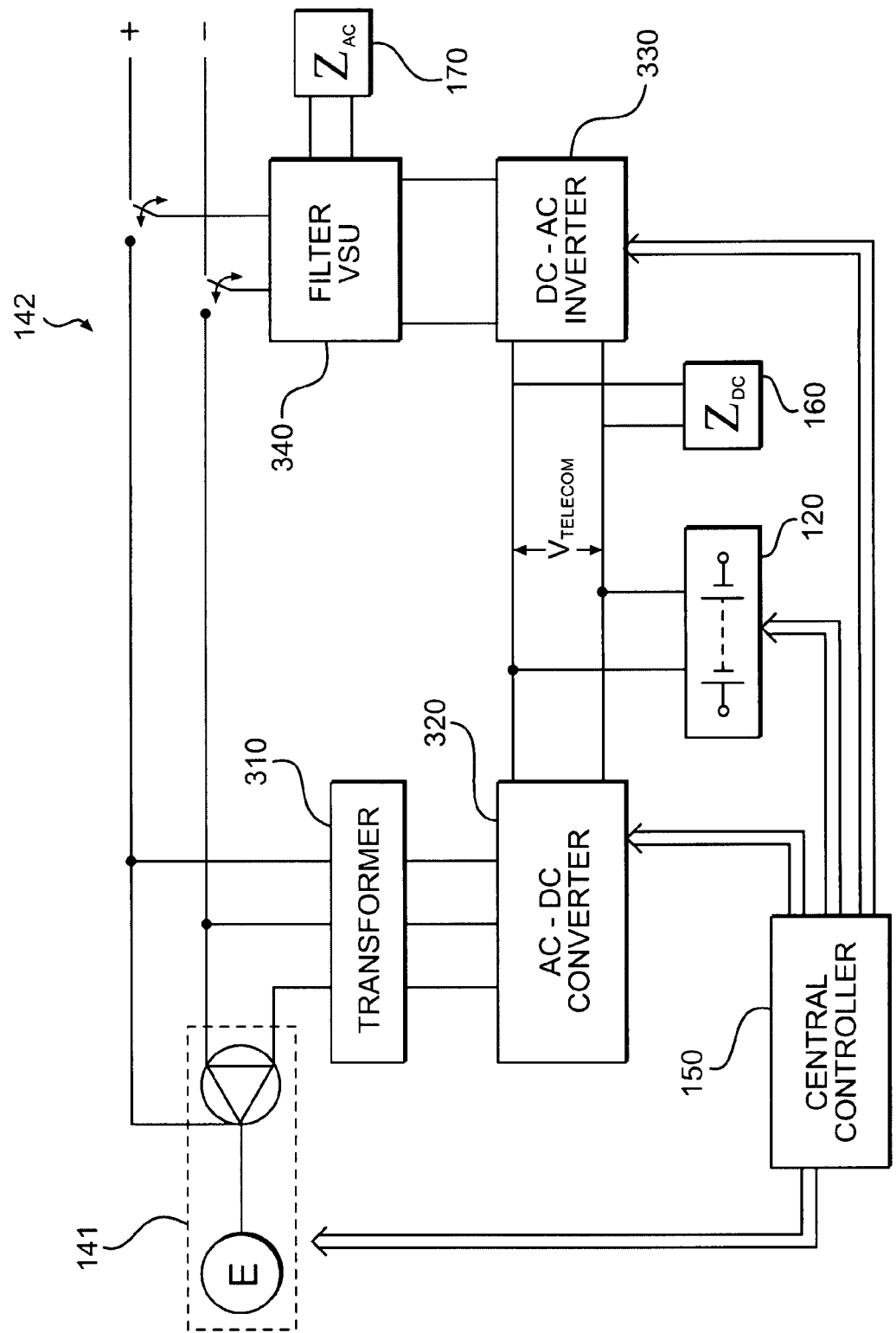
FIG. 4 illustrates a power electronic system of the variable speed genset, which includes a power transformer to step down the AC voltage to a desired level, in accordance with an exemplary embodiment of the present disclosure.
Figure 5:
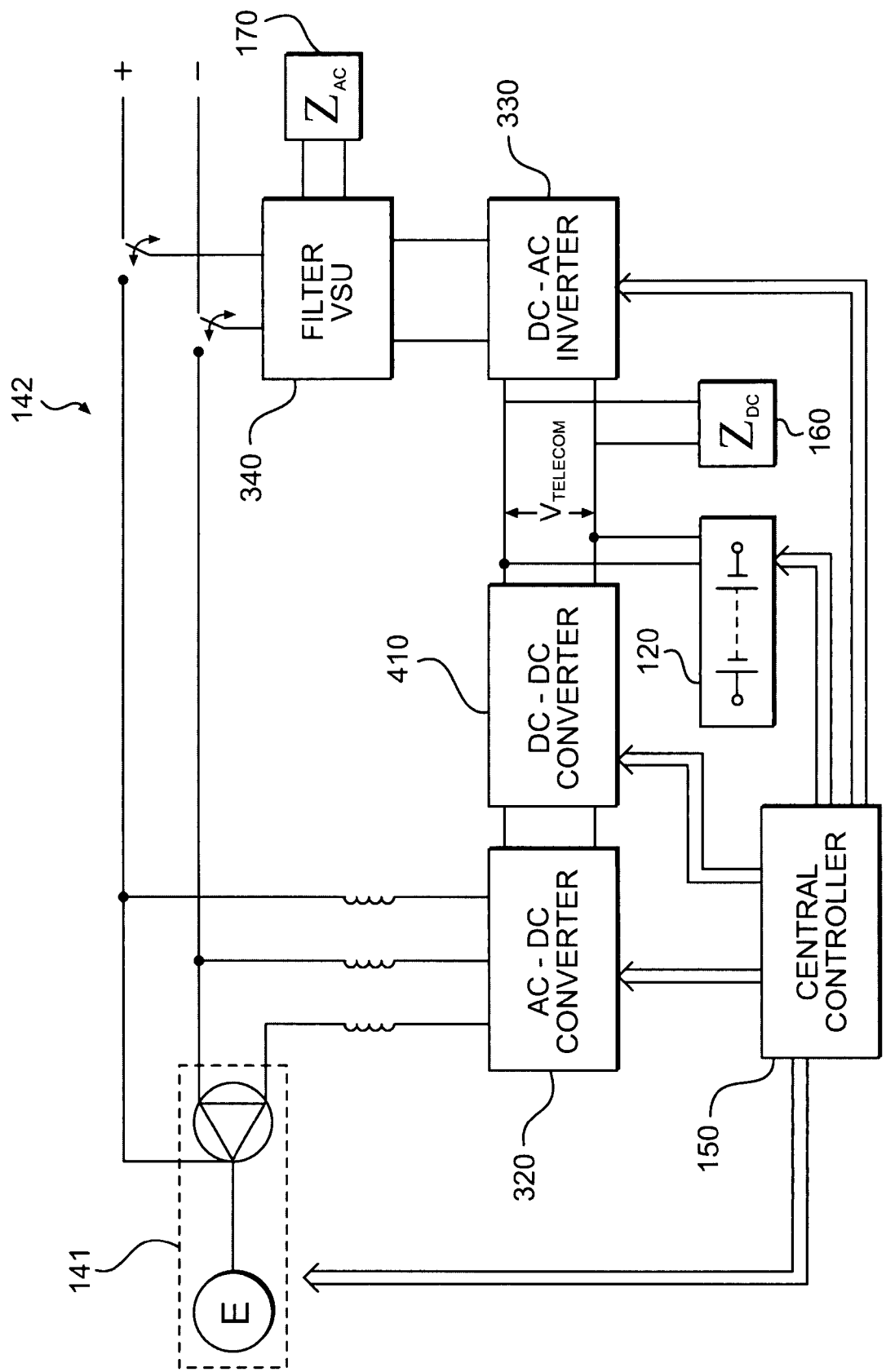
FIG. 5 illustrates a power electronic system of the variable speed genset, which includes a DC-to-DC converter to step down the DC voltage to a desired level, in accordance with an exemplary embodiment of the present disclosure.

As illustrated in FIG. 4 and FIG. 5, the power electronic system 142 may include, among other things, a power transformer 310 or a DC-to-DC converter 410 configured to scale the voltage, an AC-to-DC converter 320 configured to convert an AC power to a DC power, a DC-to-AC converter 330 configured to convert a DC power to an AC power, and a filtering and voltage step-up unit (VSU) 340. FIG. 4 illustrates the power electronic system 142 of a variable speed genset 140, which includes a power transformer 310 to adjust the AC voltage to a desired level, in accordance with an exemplary embodiment of the present disclosure.

Consistent with the disclosed embodiment, the voltage scaler may embody a power transformer 310 electrically coupled to the variable speed generator 141. The power transformer 310 may include a primary winding and a secondary winding of inductively coupled wires, and may be configured to scale the secondary induced AC voltage from the primary AC voltage by a factor equal to the ratio of the number of turns of wire in their respective windings. For example, the power transformer 310 may have a scale factor of 10:1, so that a voltage of 500 volts may be stepped down to 50 volts. The scaled AC voltage may be converted to a DC link voltage by the AC-to-DC converter 320.

Alternatively, the voltage may be scaled in a DC form after the AC-to-DC conversion. FIG. 5 illustrates an alternate embodiment of the power electronic system 142 of the variable speed genset 140. In this embodiment, the voltage scaler may embody a DC-to-DC converter 410 configured to adjust the DC voltage to a desired level, in accordance with another exemplary embodiment of the present disclosure. The DC-to-DC converter 410 may include a power electronic circuit configured to convert one DC voltage level to another via switched-mode conversion. Consistent with one disclosed embodiment, the DC-to-DC converter 410 may be a high-frequency full bridge DC-to-DC converter that has a high scale ratio (e.g., 10:1). Consistent with another disclosed embodiment, the DC-to-DC converter 410 may also be a buck DC-to-DC converter that has a relatively low scale ratio (e.g., 4:1).

As illustrated in both FIG. 4 and FIG. 5, a frequency changer may use a double conversion process to realize the frequency change. This process may include an AC-to-DC conversion followed by a DC-to-AC conversion. The AC-to-DC converter 320 may include a plurality of power electronic devices configured to convert an AC power to a DC power. Consistent with one disclosed embodiment, the AC-to-DC converter 320 may include a power factor correction circuit configured to counteract the undesirable effects of electric loads that create a power factor that is less than 1. The AC-to-DC converter 320 may further include a voltage regulation circuit configured to regulate the voltage near a constant value over a wide range of load conditions. The DC power output from the AC-to-DC converter 320 may be used to drive DC loads, for example, a telecommunication system, and/or charge the battery bank 120.

The DC-to-AC inverter 330 may include a plurality of power electronic devices and be configured to convert a DC power to an AC power, opposite to the AC-to-DC converter 320. For example, the plurality of power electronic devices may be switched on and off to conduct a pulse-width modulation (PWM) of the DC voltage. Pulse-width modulation uses a square wave whose duty cycle is modulated resulting in the variation of the average value of the waveform, in accordance with a desired frequency by the AC load 170. The PWM-modulated signal may be filtered by the filtering and VSU 340 to remove the high-frequency components, resulting in an AC voltage of the desired frequency. The AC voltage may further be stepped up by the filtering and VSU 340, based on the need of the AC load 170.

Operations of the DC-to-DC converter 410, the AC-to-DC converter 320 and the DC-to-AC inverter 330 may all be controlled by the central controller 150. The central controller 150 may collect load information, including at least the desired voltage level and desired frequency. Accordingly, the central controller 150 may determine the switching plans for the individual power converters and send a driving current to their power electronic devices.

Industrial Applicability

Although the disclosed embodiments are described in association with powering off-grid application sites, more particularly, a telecommunication system, the disclosed hybrid power system may be used in any environment where a reliable and economic power supply is needed. Specifically, hybrid power system 10 may provide a renewable power as the primary power source, store the excess primary power in an energy storage device 120, and start a variable speed genset 140 to provide a secondary power substantially following the loads when the primary power source is not available and the energy storage device is below a threshold level. Moreover, the disclosed hybrid power system may be configured to run variable speed genset 140 at a speed that corresponds to optimal fuel efficiency.

Figure 6:
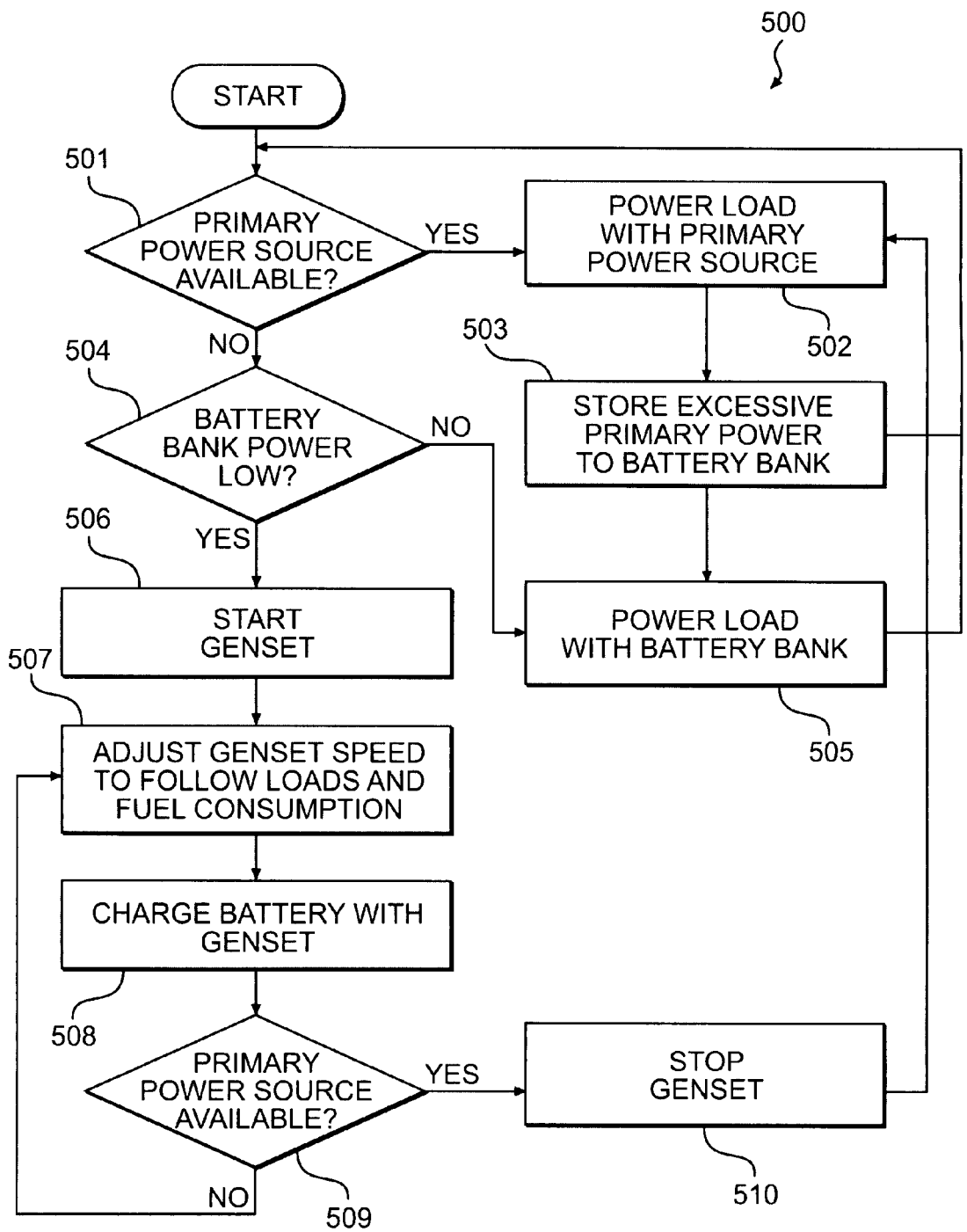
FIG. 6 provides a flowchart illustrating a hybrid power system dispatching control process, in accordance with an exemplary embodiment of the present disclosure.

FIG. 6 provides a flowchart illustrating a hybrid power system dispatching control process 500, in accordance with an exemplary embodiment of the present disclosure. As shown in FIG. 6, process 500 may determine whether the primary power source, i.e., the renewable power source 110, is available (Step 501). If the primary power source is available (Step 501: Yes), process 500 may control the primary power source 110 to continue powering loads (Step 502) and control the battery bank 120 to store excess primary power (Step 503). Step 501 may be continuously repeated to monitor the renewable power source 110 and determine whether the primary power source 110 is available.

According to the exemplary process shown in FIG. 6, if the primary power source is not available (Step 501: No) (e.g., insufficient sunlight for photovoltaic cells, insufficient wind-speed for wind powered-device, etc.), process 500 may determine whether the power stored in the battery bank 120 is sufficient to supply the power requirements of the loads (Step 504). If the stored power in the battery bank 120 is sufficient to supply the loads (Step 504: No), process 500 may control the battery bank 120 to release the power stored therein, thereby powering the loads (Step 505). For example, the controller 150 may control the battery bank 120 to directly power a DC load, such as a telecommunication system. For another example, the controller 150 may control battery bank 120 to power an AC load via the DC-to-AC converter 130. Again, Step 501 may be continuously repeated to monitor the renewable power source 110 and determine whether the primary power source is available.

As shown in FIG. 6, if the battery bank power is too low to supply the loads (Step 504: Yes), process 500 may instruct the remote start controller 143 and start the variable speed genset 140 (Step 506). Process 500 may further adjust the rotor speed of the variable speed genset 140 (Step 507). The rotor speed may be selected from a fuel map based on the power requirements of the loads. For example, the central controller 150 may determine an amount of power required by the variable speed genset 140 to meet the power requirements of the load. The central controller 150 may then determine a target torque output required by the prime mover of the variable speed genset 140 to provide the amount of power required to meet the power requirements. Based on the target torque output, the central controller 150 may identify and select a rotor speed along a fuel contour curve that limits the amount of fuel consumed by the prime mover.

For example, one of the loads connected to the hybrid power system 10, such as an accessory component in the telecommunication system, may be turned off, resulting in a reduction in the power requirements of the telecommunication system. This load change may be communicated to the central controller 150. The central controller 150 may then look up the power needs on the stored fuel map, such as the one shown in FIG. 3, to determine a rotor speed that corresponds to the lowest fuel consumption. For example, before the accessory component is turned off, the overall power needed may correspond with a required torque output of 200 Nm, and thus the variable speed genset 140 may operate at a rotor speed of 1300 rev/min to achieve the optimal fuel consumption of 220. After the accessory component is turned off, the power required by the load may decrease to a corresponding required torque output of 180 Nm. Remaining operating at a rotor speed of 1300 rev/min may yield a fuel consumption of 222. The central controller 150 may be configured to find a new optimal speed for the new power requirements. According to the fuel map shown in FIG. 3, the optimal fuel consumption corresponding to the 180 Nm output power may be 218, and accordingly, the optimal rotor speed may be around 1000 rev/min. Therefore, the central controller 150 may instruct the remote start controller 143 to adjust the rotor speed of the variable speed generator 141.

Process 500 may also charge the battery bank 120 using variable speed genset 140 (Step 508). Alternatively, process 500 may skip step 508 and not charge the battery until the primary power source is available again. Process 500 may continuously monitor the renewable power source 110 and determine whether the primary power source is back on (Step 509). Once the renewable power source 110 is available again (Step 509: Yes), process 500 may stop the variable speed genset 140 (Step 510) and use Step 502 to power the loads with the primary power source. If the renewable power source 110 is still not available (Step 509: No), process 500 may repeat step 507-509 to power the loads with the variable speed genset 140.

Consistent with the disclosed embodiments of the present disclosure, the variable speed genset 140 may improve the fuel efficiency and, accordingly, the cost effectiveness of the hybrid power system 10. For example, the variable speed genset 140 may rotate at a variable speed in accordance with the power requirements of the load. In contrast with conventional FPMRT systems that operate at a single power level and frequency regardless of the requirement of the load, the presently disclosed hybrid power system 10 may be driven by the power requirements of the load, thereby limiting the energy losses during charging and discharging of the battery (approximately 20%). Additionally, since no excess power generated by the genset needs to be stored, the battery bank 120 may not have to be oversized. As a result, purchase, maintenance, and repair costs of the battery bank 120 may be significantly reduced over conventional systems that require oversized battery units.

Moreover, because the central controller 150 employs fuel map to determine an optimal operating speed for the variable speed genset 140, based on the power requirements of the loads, less fuel may be consumed. Because fuel costs are a major portion of the total cost of the hybrid power system 10, incorporation of the fuel map and its corresponding control strategy may improve the efficiency and cost effectiveness of the system.

In addition, by providing a power electronic system 142 that adjusts power output frequency and voltage levels of the variable speed genset 140, the hybrid power system 10 may be configured to customize voltage supplies to conform to the specific requirements of off-grid application sites. For example, a telecommunication system coupled to the hybrid power system 10 may require a voltage supply of 48 v or 24 v. As disclosed in the exemplary embodiments in FIG. 4 and FIG. 5, a power transformer 310 or a DC-to-DC converter may be incorporated to scale the voltage to a desired level. As another example, an accessory coupled to the hybrid power system 10 may include an AC motor that requires a voltage supply of 60 Hz. As disclosed in the exemplary embodiments in FIG. 4 and FIG. 5, the power electronic system 142 may include an AC-to-DC converter and a DC-to-AC converter to change the frequency of the power supply via an AC-to-DC-to-AC double conversion.

It will be apparent to those skilled in the art that various modifications and variations can be made to the disclosed hybrid power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A hybrid power system, comprising:
   a primary power source configured to provide a primary power;
   an energy storage device coupled to the primary power source, the energy storage device configured to store excess primary power provided by the primary power source;
   a variable speed genset, the variable speed genset including a secondary power source configured to operate at a variable rotor speed to provide a secondary power responsive to power requirements of a load; and
   a central controller communicatively coupled to the primary power source, the energy storage device, and the variable speed genset, the central controller configured to:
      control the primary power source, the energy storage device, and the variable speed genset based on the power requirements of the load,
      monitor the power requirements of the load and a power output of the variable speed genset,
      use a subtractor node to determine a difference between the power requirements of the load and the power output of the variable speed genset, and
      adjust a rotor speed of the variable speed genset so that a magnitude of an adjustment to the rotor speed depends on a magnitude of the difference; and
   wherein the hybrid power system is configured to supply at least one of the primary power and the secondary power to a telecommunication system.

2. The hybrid power system of claim 1, wherein the variable speed genset includes:
   at least one variable speed generator configured to provide a variable-frequency electrical power output;
   a power electronic system configured to convert the variable-frequency electrical power output to a fixed-frequency associated with the power requirements of the load; and
   a remote start controller configured to remotely operate the at least one variable speed generator and the power electronic system.

3. The hybrid power system of claim 2, wherein the power electronic system includes:
   a frequency changer configured to change the frequency of a voltage; and
   a voltage scaler configured to resize a voltage level.

4. The hybrid power system of claim 3, wherein the power electronic system includes an AC-to-DC converter and a DC-to-AC converter, configured to conduct an AC-to-DC-to-AC double conversion.

5. The hybrid power system of claim 4, wherein the AC-to-DC converter includes a power factor correction circuit.

6. The hybrid power system of claim 3, wherein the voltage scaler includes at least one of a power transformer configured to adjust a voltage level of AC power, a DC-to-DC converter configured to adjust a voltage level of DC power, or a buck converter configured to adjust a voltage level of DC power.

7. The hybrid power system of claim 1, wherein the secondary power source is a diesel combustion engine.

8. The hybrid power system of claim 1, wherein the primary power source is a renewable power source.

9. The hybrid power system of claim 8, wherein the renewable power source is a photovoltaic power source.

10. The hybrid power system of claim 1, wherein the energy storage device is a battery bank.

11. The hybrid power system of claim 1, wherein the energy storage device is further coupled to the variable speed genset and configured to store excess secondary power provided by the variable speed genset.

12. The hybrid power system of claim 1, wherein the central controller stores a fuel map including at least one fuel consumption curve corresponding to a fuel consumption limit and uses the fuel map to adjust the rotor speed of the variable speed genset further based on the fuel consumption limit.

13. A method for controlling a hybrid power system for a telecommunication system, the method comprising:
   monitoring a power level associated with a primary power source;
   causing an energy storage device to store excess primary power when the power level associated with the primary power source exceeds a power requirement of a load and release stored power when the power level associated with the primary power source is less than the power requirement of the load;
   monitoring a power level stored in the energy storage device;
   operating a variable speed genset when the power level associated with the primary power source is less than the power requirements of the load and the power level stored in the energy storage device is less than a threshold level, the variable speed genset being configured to generate a secondary power, wherein operating the variable speed genset includes adjusting a rotor speed of the variable speed genset based on the power requirements of the load and a fuel consumption limit selected from a plurality of fuel consumption limits, wherein the rotor speed is adjusted to maintain fuel consumption below the selected fuel consumption limit; and supplying at least one of the primary power and the secondary power to the telecommunication system.

14. The method of claim 13, further including causing the energy storage device to store excess secondary power.

15. The method of claim 13, wherein operating the variable speed genset further includes continuously monitoring power requirements of the load; and the rotor speed of the variable speed genset is adjusted using a feedback control scheme based on a fuel map including at least one fuel consumption curve in response to the monitored power requirements of the load, the at least one fuel consumption curve corresponding to the selected fuel consumption limit.

16. The method of claim 13, wherein the variable speed genset includes a power electronic system, the method further including causing the power electronic system to adjust a frequency of the secondary power based on the power requirements of the load.

17. The method of claim 13, further comprising:
monitoring the power requirements of the load and a power output of the variable speed genset; and
determining a difference between the power requirements of the load and the power output of the variable speed genset;
wherein the rotor speed is adjusted based on the difference.

18. The method of claim 17, further comprising using a subtractor node to determine the difference between the power requirements of the load and the power output of the variable speed genset.

19. A hybrid power system for a telecommunication system, the hybrid power system comprising:
a primary power source configured to provide a primary power;
an energy storage device coupled to the primary power source, the energy storage device configured to store excess primary power provided by the primary power source;
a variable speed genset, the variable speed genset including a secondary power source configured to operate at a variable rotor speed to provide a secondary power responsive to power requirements of a load; and
a central controller communicatively coupled to the primary power source, the energy storage device, and the variable speed genset, the central controller configured to:
control the primary power source, the energy storage device, and the variable speed genset based on the power requirements of the load,
monitor the power requirements of the load and a power output of the variable speed genset,
use a subtractor node to determine a difference between the power requirements of the load and the power output of the variable speed genset, and
adjust a fuel injection amount supplied to the variable speed genset so that a magnitude of an adjustment to the fuel injection amount depends on a magnitude of the difference; and
wherein the hybrid power system is configured to supply at least one of the primary power and the secondary power to the telecommunication system.

20. The hybrid power system of claim 19, wherein:
the difference between the power requirements of the load and the power output of the variable speed genset is a first difference; and
the central controller is configured to:
determine a second difference between a fuel injection control signal and the first difference,
determine the fuel injection amount based on the second difference, and
control the variable speed genset based on the fuel injection amount.

21. The hybrid power system of claim 20, wherein the central controller is configured to use a second subtractor node to determine the second difference.

22. The hybrid power system of claim 20, wherein the central controller is configured to determine the fuel injection control signal based on a rotor speed, which is determined based on a target torque.

23. The hybrid power system of claim 22, wherein the central controller is configured to determine the fuel injection control signal further based on a fuel consumption limit selected from a plurality of fuel consumption limits, the rotor speed being selected to maintain fuel consumption below the selected fuel consumption limit.

* * * * *